United States Patent
Hokoi (10) Patent No.: US 9,140,357 B2
(45) Date of Patent: Sep. 22, 2015

(54) VEHICLE AND CONTROL METHOD FOR VEHICLE

(75) Inventor: Koji Hokoi, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/122,359

(22) PCT Filed: Jul. 7, 2011

(86) PCT No.: PCT/JP2011/065539
§ 371 (c)(1),
(2), (4) Date: Nov. 26, 2013

(87) PCT Pub. No.: WO2013/005324
PCT Pub. Date: Jan. 10, 2013

(65) Prior Publication Data
US 2014/0188356 A1  Jul. 3, 2014

(51) Int. Cl.
| | |
|---|---|
| *F16H 59/10* | (2006.01) |
| *F16H 61/68* | (2006.01) |
| *F16H 59/08* | (2006.01) |
| *F16H 61/12* | (2010.01) |

(52) U.S. Cl.
CPC ............... *F16H 61/68* (2013.01); *F16H 59/08* (2013.01); *F16H 61/12* (2013.01)

(58) Field of Classification Search
CPC ....... F16H 59/10; F16H 59/105; F16H 59/08; F16H 61/12; F16H 61/68; F16H 2061/1284; F16H 2061/1208; F16H 2061/1212; F16H 2061/168; F16H 2061/1232; B60W 50/0205; B60W 50/029; B60W 20/50; B60W 2050/0215; B60W 2050/0292; B60W 2050/0295; Y10T 74/2003; Y10T 74/20085
See application file for complete search history.

(56) References Cited

U.S. PATENT DOCUMENTS

| | | | |
|---|---|---|---|
| 5,109,721 A | 5/1992 | Boardman et al. | |
| 2001/0029414 A1* | 10/2001 | Nada | 701/34 |
| 2006/0030451 A1* | 2/2006 | Takagi | 477/34 |
| 2007/0021260 A1* | 1/2007 | Nozaki et al. | 475/119 |
| 2008/0040009 A1* | 2/2008 | Kamada et al. | 701/51 |
| 2009/0204282 A1 | 8/2009 | Mizutani | |

FOREIGN PATENT DOCUMENTS

| | | |
|---|---|---|
| JP | S61-157441 A | 7/1986 |
| JP | H05-157169 A | 6/1993 |
| JP | 2001-289067 A | 10/2001 |
| JP | 2003-294134 A | 10/2003 |

(Continued)

*Primary Examiner* — Edwin A Young
(74) *Attorney, Agent, or Firm* — Sughrue Mion, PLLC (57) ABSTRACT

A vehicle includes a shift sensor and an ECU that switches a shift range based on a combination of shift signals received from the shift sensor. The ECU includes a determining unit and a switching unit. The determining unit determines, based on how a shift signal pattern has changed (the number and type of shift signals that have changed), whether or not to execute first fail-safe traveling in which a shift range before occurrence of a shift abnormality is maintained. In the event of a shift abnormality, in a case where execution of the first fail-safe traveling is permitted, the switching unit executes the first fail-safe traveling to maintain a shift range before occurrence of the shift abnormality, and in a case where execution of the first fail-safe traveling is prohibited, the switching unit executes second fail-safe traveling to switch a shift range to an N range.

7 Claims, 7 Drawing Sheets

(56) References Cited

FOREIGN PATENT DOCUMENTS

| JP | 2006-256501 A | 9/2006 |
| JP | 2008-121835 A | 5/2008 |
| JP | 2009-133459 A | 6/2009 |

* cited by examiner

|   | T1 | T2 | T3 | T4 | T5 | T6 | T7 |
|---|---|---|---|---|---|---|---|
| P | 1 |  |  |  |  | 1 | 1 |
| S11 | 1 | 1 |  |  |  | 1 | 1 |
| S12 | 1 | 1 |  |  |  | 1 |  |
| R |  | 1 |  |  |  | 1 |  |
| S21 |  | 1 | 1 |  |  | 1 |  |
| S22 |  | 1 | 1 |  |  | 1 | 1 |
| S23 |  | 1 | 1 |  |  |  | 1 |
| N |  |  | 1 |  |  |  | 1 |
| S31 |  |  | 1 |  |  |  |  |
| S32 |  |  | 1 | 1 |  |  |  |
| S33 |  |  | 1 | 1 | 1 |  |  |
| D |  |  |  | 1 | 1 |  |  |
| B |  |  |  | 1 | 1 |  | 1 |

|   | T1 | T2 | T3 | T4 | T5 | T6 | T7 |
|---|----|----|----|----|----|----|----|
| P | 1 |   |   | ● | ● | × | 1 |
| S11 | 1 | 1 |   | ● | ● | × | 1 |
| S12 | 1 | 1 |   | ● | ● | × |   |
| R |   | 1 |   | ● | ● | × |   |
| S21 |   | 1 | 1 | ● | ● | × |   |
| S22 |   | 1 | 1 | ● | ● | × | 1 |
| S23 |   | 1 | 1 | ● | ● |   | 1 |
| N |   |   | 1 | ● | ● |   | 1 |
| S31 |   |   | 1 | ● | ● |   |   |
| S32 |   |   | 1 | 1 | ● |   |   |
| S33 |   |   | 1 | 1 | 1 |   |   |
| D |   |   |   | 1 | 1 |   |   |
| B |   |   |   | 1 | 1 |   | 1 |

DIFFERENCE IS 1

T4, T5 ON FAILURE "●" AND T6 OFF FAILURE "×"

FIG.7

|   | T1 | T2 | T3 | T4 | T5 | T6 | T7 |
|---|----|----|----|----|----|----|----|
| P | 1 |   |   | ● | ● | 1 | 1 |
| S11 | 1 | 1 |   | ● | ● | 1 | 1 |
| S12 | 1 | 1 |   | ● | ● | 1 |   |
| R |   | 1 |   | ● | ● | 1 |   |
| S21 |   | 1 | 1 | ● | ● | 1 |   |
| S22 |   | 1 | 1 | ● | ● | 1 | 1 |
| S23 |   | 1 | 1 | ● | ● |   | 1 |
| N |   |   | 1 | ● | ● |   | 1 |
| S31 |   |   | 1 | ● | ● |   |   |
| S32 |   |   | 1 | 1 | ● |   |   |
| S33 |   |   | 1 | 1 | 1 |   |   |
| D |   |   |   | 1 | 1 |   |   |
| B |   |   |   | 1 | 1 |   | 1 |

DIFFERENCE IS 1

T4, T5 ON FAILURE "●"

VEHICLE AND CONTROL METHOD FOR VEHICLE

CROSS REFERENCE TO RELATED APPLICATIONS

This application is a National Stage of International Application No. PCT/JP2011/065539 filed Jul. 7, 2011, the contents of all of which are incorporated herein by reference in their entirety.

TECHNICAL FIELD

The present invention relates to a vehicle switching a shift range by a shift-by-wire scheme and a control method for the vehicle.

BACKGROUND ART

A vehicle that employs a shift-by-wire scheme in which a shift range is switched based on a result of electrical detection of the position of a shift lever has been known.

Regarding such a vehicle, Japanese Patent Laying-Open No. 2001-289067 (PTL 1), for example, discloses a technique of permitting a vehicle to move in a neutral range in a case where there is an abnormality in a parking range, yet the neutral range is normal, on the precondition that a driver is depressing a brake pedal.

CITATION LIST

Patent Literature

PTL 1: Japanese Patent Laying-Open No. 2001-289067
PTL 2: Japanese Patent Laying-Open No. 2009-133459
PTL 3: Japanese Patent Laying-Open No. 2008-121835
PTL 4: Japanese Patent Laying-Open No. 2003-294134

SUMMARY OF INVENTION

Technical Problem

However, with the technique disclosed in PTL 1, in the event of a shift abnormality where a combination of shift signals output by a shift sensor corresponds to none of a plurality of predefined normal patterns, the vehicle can be caused to move only in the neutral range. For this reason, it may not be possible to realize fail-safe (limp-home) traveling that reflects a user's intention.

The present invention has been made to solve the above-described problem, and an object of the invention is to realize fail-safe traveling that reflects a user's intention in the event of a shift abnormality.

Solution to Problem

A vehicle according to the present invention includes: a shift sensor outputting a plurality of shift signals changing in combination in accordance with a shift manipulation by a user; and a control device controlling a shift range in accordance with a combination of the shift signals. The control device monitors a change in the shift signals and, in the event of a shift abnormality where a combination of the shift signals after a change corresponds to none of a predefined plurality of combinations, determines, in accordance with how the shift signals have changed, whether or not to execute first fail-safe traveling in which a shift range before occurrence of the shift abnormality is maintained.

Preferably, in the event of the shift abnormality, the control device executes, when the number of changes in the shift signals is equal to or less than a threshold value, the first fail-safe traveling and prohibits execution of the first fail-safe traveling when the number of changes in the shift signals is greater than the threshold value.

Preferably, the combination of the shift signals is pre-defined such that the number of signals that differ between signal patterns including a signal pattern for a parking position, a signal pattern for a rearward position, a signal pattern for a neutral position, and a signal pattern for a forward position is equal to or more than a predetermined value. The threshold value is set to a smaller value than the predetermined value.

Preferably, the control device stores a combination of the shift signals at the time of an initial change in the shift signals and, in a case where a combination of the shift signals has further changed from a stored combination, prohibits execution of the first fail-safe traveling even if the number of changes in the shift signals is equal to or less than the threshold value.

Preferably, in the event of the shift abnormality, when a shift range before occurrence of the shift abnormality is a particular shift range, the control device executes the first fail-safe traveling until a new input of a predetermined shift signal is received, and prohibits execution of the first fail-safe traveling at the time of receiving a new input of the predetermined shift signal.

Preferably, in a case where the shift abnormality has occurred and where execution of the first fail-safe traveling is prohibited, the control device executes a second fail-safe traveling in which a shift range is switched to a predetermined shift range.

Preferably, the predetermined shift range is a neutral range.

A control method according to another aspect of the present invention is a control method for a vehicle that includes a shift sensor outputting a plurality of shift signals changing in combination in accordance with a shift manipulation by a user and a control device controlling a shift range in accordance with a combination of the shift signals. The method includes the steps of: monitoring a change in the shift signals; and in the event of a shift abnormality where a combination of the shift signals after a change corresponds to none of a predefined plurality of combinations, determining, in accordance with how the shift signals have changed, whether or not to execute first fail-safe traveling in which a shift range before occurrence of the shift abnormality is maintained.

Advantageous Effects of Invention

According to the present invention, fail-safe traveling that reflects a user's intention can be realized in the event of a shift abnormality.

DESCRIPTION OF EMBODIMENTS

An embodiment of the present invention will be hereinafter described with reference to the drawings. In the following description, the same parts are denoted by the same reference signs. These parts also have the same names and functions. Therefore, a detailed description of them will not be repeated.

Figure 1:
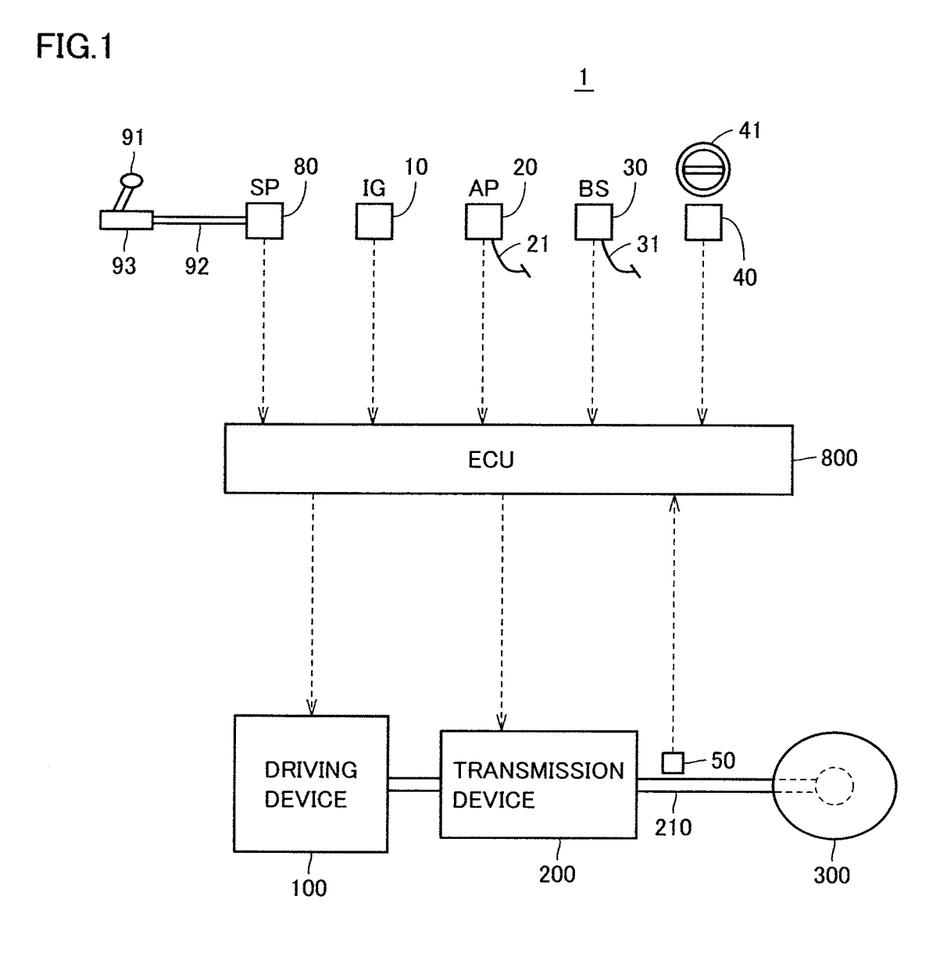
FIG. 1 is an overall block diagram of a vehicle.

FIG. 1 is an overall block diagram of a vehicle 1 according to the present embodiment. Vehicle 1 includes a drive device 100, a transmission device 200, a wheel 300, and an ECU (Electronic Control Unit) 800. Vehicle 1 further includes an IG switch 10, an accelerator pedal 21, a brake pedal 31, a steering wheel 41, and a shift lever 91, which are manipulated by a driver. Vehicle 1 further includes an accelerator position sensor 20, a brake stroke sensor 30, a steering angle sensor 40, a vehicle speed sensor 50, and shift sensor 80.

Drive device 100 and transmission device 200 are controlled by a control signal from ECU 800.

Drive device 100 is a device that generates driving force for vehicle 1. Drive device 100 is representatively configured of an engine, a motor, and the like.

Transmission device 200 is provided between drive device 100 and wheel 300, and changes the rotation speed of drive device 100 and transmits the resultant rotation speed to wheel 300. Transmission device 200 includes a plurality of friction engagement elements (a clutch and a brake) for switching a power transmission direction and a gear ratio, and a parking gear for fixing an output shaft 210 of transmission device 200. A control state of transmission device 200 (hereinafter also referred to as "shift range") is switched to any of a P (parking) range, a R (reverse) range, a N (neutral) range, a D (drive) range, and a B (brake) range, in accordance with the control signal from ECU 800. This scheme of switching the shift range by electrical control is also called a shift-by-wire scheme. In the D range, the B range and the R range, the driving force of drive device 100 is transmitted to wheel 300, causing vehicle 1 to travel. In the D range and the B range, vehicle 1 is caused to travel in a forward direction. The B range is a shift range in which an engine brake is more effective than in the D range. In the R range, vehicle 1 is caused to travel in a rearward direction. The D range, the B range and the R range will hereinafter also be collectively referred to as "driving range". In the N range, on the other hand, the driving force of drive device 100 is not transmitted to wheel 300. In the P range, the parking gear within transmission device 200 is actuated to fix output shaft 210, and rotation of wheel 300 is suppressed. The N range and the P range will hereinafter also be collectively referred to as "non-driving range".

IG switch 10 is a switch for the driver to input requests for starting up and stopping a drive system of vehicle 1 (electrical equipment required to control traveling of vehicle 1). Positions to which IG switch 10 is manipulated include an IG-OFF position for bringing the drive system into a stop state (Ready-OFF state), an IG-ON position for applying electric power to the drive system, a start position for bringing the drive system into a startup state (Ready-ON state), and the like.

Accelerator position sensor 20 detects a position (accelerator position) AP of accelerator pedal 21. Brake stroke sensor 30 detects an amount of manipulation (brake stroke) BS of brake pedal 31. Steering angle sensor 40 detects a steering angle of steering wheel 41. Vehicle speed sensor 50 detects a vehicle speed V based on the rotation speed of output shaft 210 of transmission device 200.

Shift sensor 80 is mechanically connected by a push-pull cable 92 to shift lever 91, which is manipulated by a user along a shift gate 93. Shift sensor 80 outputs, to ECU 800, a shift signal corresponding to a position of shift lever 91 (hereinafter also referred to as "shift position"). The shift signal is used by ECU 800 to determine (recognize) the shift range requested by the driver (hereinafter also referred to as "requested range"). The shift signal includes a plurality of types of signals (seven types in the present embodiment, as will be described later).

ECU 800 has a CPU (Central Processing Unit) and a memory incorporated therein, both not shown, and executes predetermined arithmetic processing based on information stored in the memory and information from each sensor. Based on a result of the arithmetic processing, ECU 800 controls devices mounted on vehicle 1.

ECU 800 recognizes the requested range based on a combination of a plurality of types of shift signals received from shift sensor 80, and controls transmission device 200 so as to realize the recognized requested range.

Figure 2:
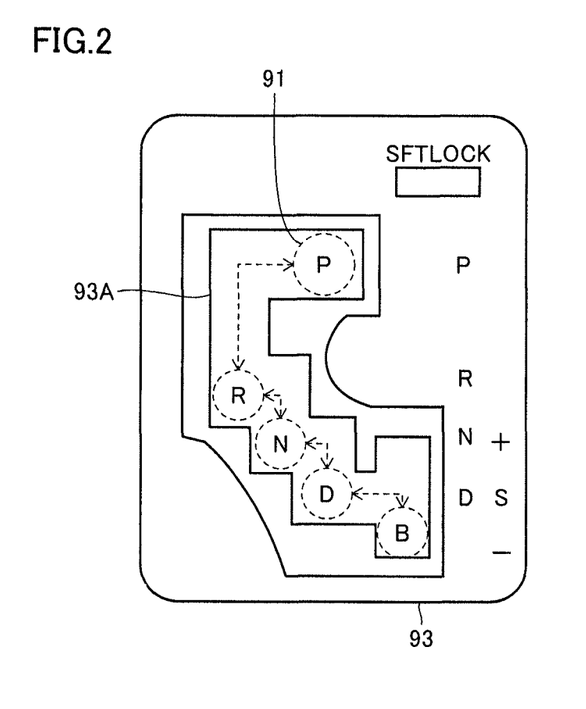
FIG. 2 shows a shift gate.

FIG. 2 shows shift gate 93. As shown in FIG. 2, shift gate 93 has a groove 93A for restricting a movement path of shift lever 91. Shift lever 91 is moved along groove 93A from the P position side to the P, R, N, D, and B positions in this order.

Figure 3:
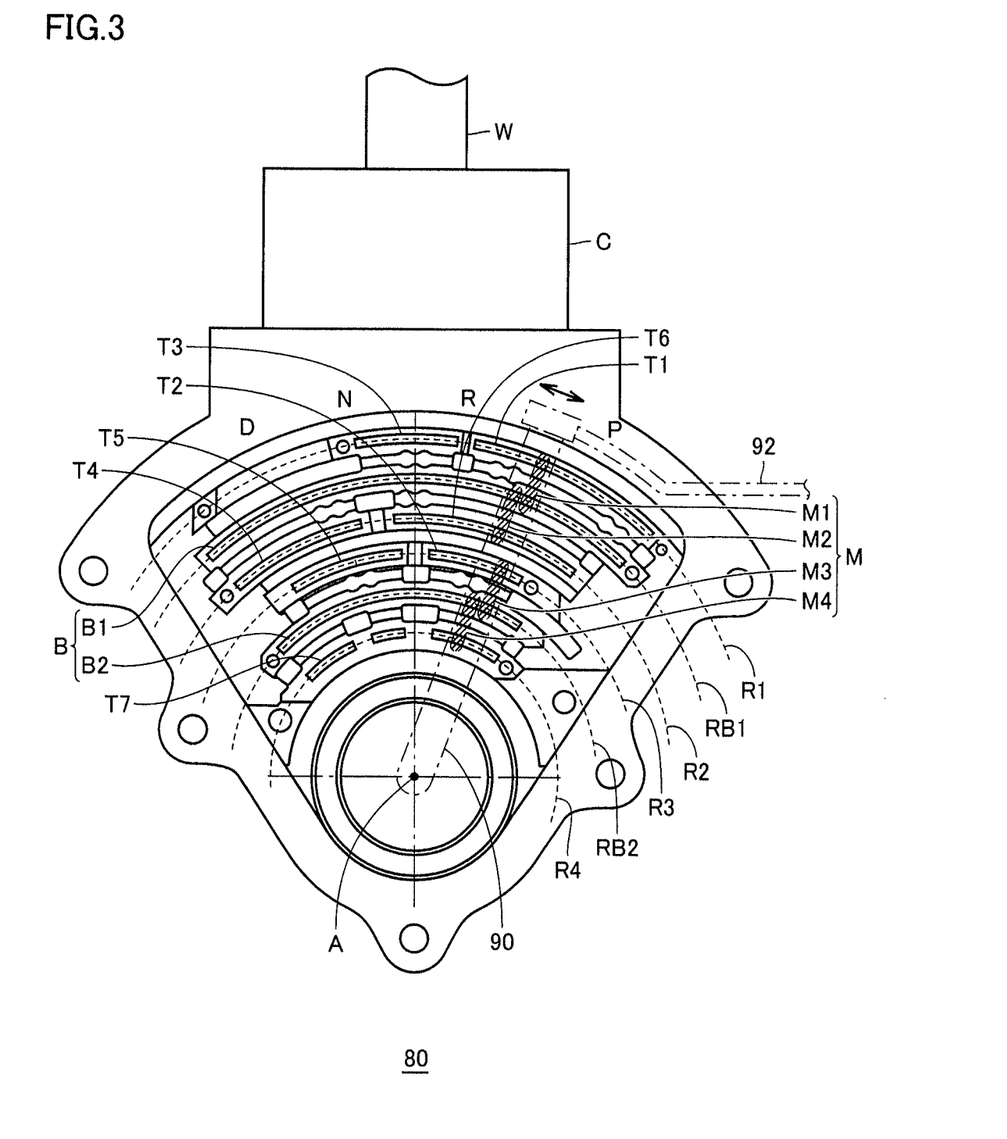
FIG. 3 shows an example of a structure of a shift sensor.

FIG. 3 shows an example of a structure of shift sensor 80. Shift sensor 80 includes a movable member 90, four movable contacts M (M1 to M4), seven fixed contacts T1 to T7, two power supply terminals B (B1, B2), and a shift connector C. Shift connector C is connected to ECU 800 by a shift wire W.

Movable member 90 has one end connected to shift lever 91 through push-pull cable 92, and the other end pivotably connected to a pivot shaft A. In accordance with a shift manipulation by the driver, push-pull cable 92 is pushed or pulled, which causes movable member 90 to be pivoted around pivot shaft A to a position corresponding to a shift position.

Movable contacts M1 to M4 are fixed to movable member 90. Therefore, as movable member 90 is pivoted to the position corresponding to the shift position, four movable contacts M1 to M4 are also pivoted to the position corresponding to the shift position.

Fixed contacts T1 to T7 are arranged on any of four concentric tracks R1 to R4 around pivot shaft A, so as not to cross one another. In this way, fixed contacts T1 to T7 are arranged substantially parallel to a pivot locus of movable member 90 (pivot loci of movable contacts M1 to M4).

Power supply terminals B1, B2 are supplied with a predetermined voltage (for example, a voltage of about 12 volts) through shift wire W from a single terminal, which is not shown in the drawings.

Power supply terminal B1 is configured to extend substantially parallel to tracks R1, R2 on a track RB1 between track R1 and track R2, and to be constantly in contact with movable contacts M1, M2. Power supply terminal B2 is configured to extend substantially parallel to tracks R3, R4 on a track RB2 between track R3 and track R4, and to be constantly in contact with movable contacts M3, M4.

Fixed contacts T1 to T7 are brought into conduction with power supply terminals B1, B2, by coming into contact with movable contacts M1 to M4 in accordance with the positions of movable contacts M1 to M4. A predetermined voltage is thereby supplied to fixed contacts T1 to T7 from power supply terminals B1, B2. The voltage supplied to each of fixed contacts T1 to T7 from power supply terminals B1, B2 through movable contacts M1 to M4 is output as a shift signal to ECU 800 through shift wire W.

Figure 4:
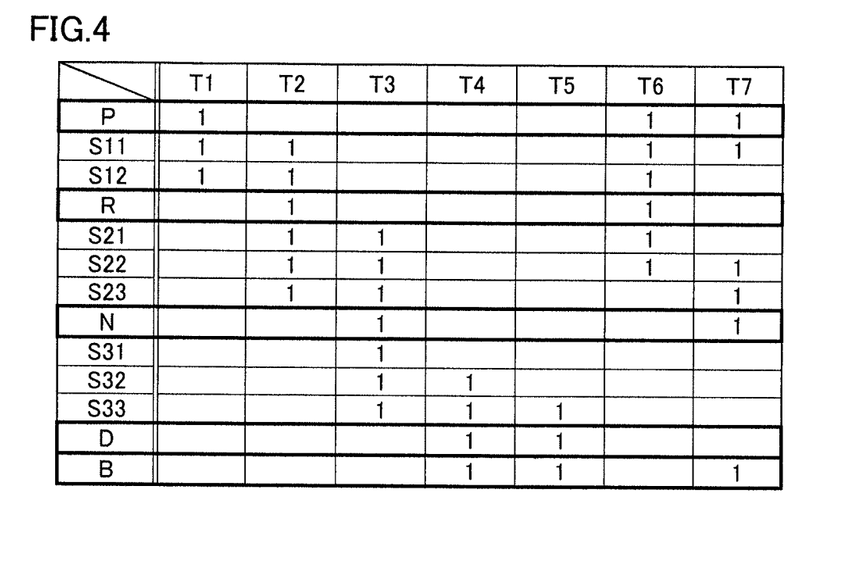
FIG. 4 shows normal patterns of shift signals.

FIG. 4 is a diagram showing normal patterns of shift signals. In FIG. 4, the horizontal axis shows types of shift signals (distinctions between fixed contacts T1 to T7), and the vertical axis shows shift positions, wherein "1" represents an "ON (a conductive state between power supply terminal B and each of fixed contacts T1 to T7)" state of each shift signal, and a blank field represents an "OFF (a non-conductive state between power supply terminal B and each of fixed contacts T1 to T7)" state of each shift signal. It is noted that a shift signal output from a fixed contact Tn (n=1 to 7) will hereinafter also be denoted as "shift signal Tn" or simply as "Tn".

When shift sensor 80 is normal, a combination of shift signals (hereinafter also referred to as "shift signal pattern") corresponds to any of the plurality of predetermined normal patterns shown in FIG. 4. As can be seen from FIG. 4, in the present embodiment, the number of shift signals that differ between shift patterns of P, R, N, D, and B is defined such that the number is each equal to or more than three, except for between the D and B patterns. In particular, the number of shift signals that differ between the D pattern and any of the P, R, and N patterns is defined such that the number is equal to or more than four.

In vehicle 1 that has a structure as above, in the event of an abnormality where a shift signal pattern corresponds to none of the normal patterns shown in FIG. 4 (hereinafter referred to as "shift abnormality"), ECU 800 determines that shift sensor 80 has failed, and causes vehicle 1 to perform fail-safe traveling.

Conventionally, in the event of a shift abnormality, it is possible to make an erroneous determination of a requested range, thus a requested range is set to "requested range indeterminate", the shift range is forced to switch to the N range without any distinction of whether the shift abnormality was triggered by a shift manipulation or by a failure of the shift sensor (hereinafter also referred to simply as "sensor failure"), and the vehicle is caused to perform fail-safe traveling by inertia or towing. However, such conventional fail-safe traveling has a problem that in the event of a shift abnormality during traveling in the D range, for example, even though the shift abnormality was triggered by a sensor failure (that is, no shift manipulation was performed by a user), the shift range is forced to switch to the N range, and fail-safe traveling that reflects the user's intention cannot be achieved. For this reason, it has been need to further increase the level of fail-safe traveling capability.

Thus, in the event of a shift abnormality, ECU 800 according to the present embodiment determines, in accordance with how a shift signal pattern has changed, whether or not to execute fail-safe traveling in which a shift range before occurrence of the shift abnormality is maintained (hereinafter also referred to as "first fail-safe traveling"). More specifically, ECU 800 monitors a change in a shift signal pattern, isolates, based on how the shift signal pattern has changed (the number and/or type of the shift signals that have changed), whether or not the shift signal pattern after a change is a pattern that can be caused by a shift manipulation, allows execution of the first fail-safe traveling only when the shift signal pattern is a pattern that cannot be caused by a shift manipulation, and prohibits execution of the first fail-safe traveling when the shift signal pattern is a pattern that can be caused by a shift manipulation. At the time of actual occurrence of a shift abnormality, in the case where execution of the first fail-safe traveling is allowed, ECU 800 executes the first fail-safe traveling (maintains a shift range before occurrence of the shift range abnormality), while in the case where execution of the first fail-safe traveling is prohibited, ECU 800 executes fail-safe traveling in which the shift range is switched to the N range (hereinafter also referred to as "second fail-safe traveling").

Figure 5:
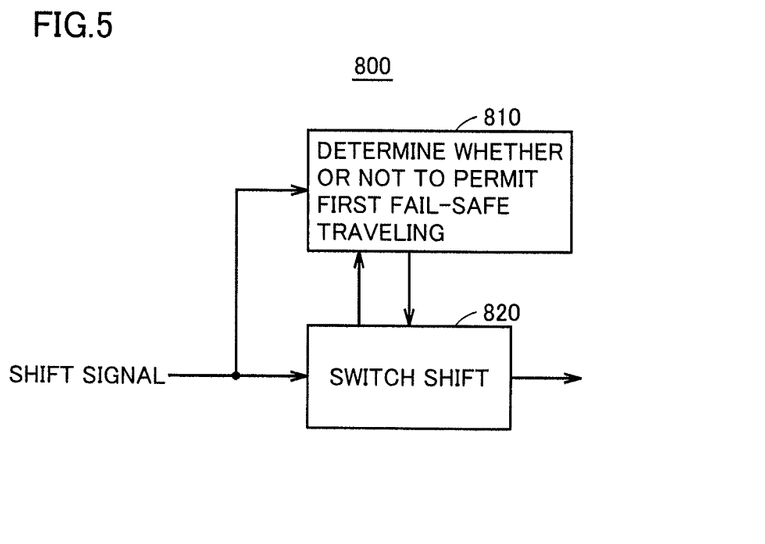
FIG. 5 is a functional block diagram of an ECU.

FIG. 5 is a functional block diagram of a portion of ECU 800 relevant to control on fail-safe traveling. Each functional block shown in FIG. 5 may be realized by hardware or by software.

ECU 800 includes a determining unit 810 and a switching unit 820.

Determining unit 810 determines, based on how a shift signal pattern has changed, whether or not to permit execution of the above-described first fail-safe traveling. Specifically, determining unit 810 performs "prohibition determination based on a result of a difference check" and "prohibition determination based on the shift position".

First, "prohibition determination based on a result of a difference check" will be described.

To isolate whether a shift abnormality was triggered by a shift manipulation or by a sensor failure, determining unit 810 makes a comparison between a normal pattern corresponding to a present shift range (hereinafter also referred to as "current range") and a present shift signal pattern, and calculates the number of types of shift signals that differ between these patterns as "difference". This process is "difference check". For instance, in the event of an ON failure (a failure in which a contact is always ON) of fixed contact T1 during traveling in the D range, the normal pattern corresponding to the present D range is [T4, T5], whereas the present shift signal pattern is [T1, T4, T5], which results in that only one type of a shift signal, "T1" differs between the normal and present patterns and that the difference is "1". In the event of an OFF failure (a failure in which a contact is always OFF) of fixed contact T1 and an ON failure of fixed contact T4 during a stop in the P range, the normal pattern corresponding to the present P range is [T1, T6, T7], whereas the present signal pattern is [T4, T6, T7], which results in that two types of shift signals, "T1" and "T4" differ between the normal and present patterns and that the difference is "2".

When the difference obtained by a difference check is equal to or more than two, determining unit 810 prohibits execution of the first fail-safe traveling (maintenance of the current range) because there is a relatively high possibility that the shift abnormality was triggered by a shift manipulation (there is a relatively high possibility that a requested range has been changed from the current range).

On the other hand, when the difference is equal to or less than one, determining unit 810 allows execution of the first fail-safe traveling because there is a relatively low possibility that the shift abnormality was triggered by a shift manipulation (there is a relatively low possibility that a requested range has been changed from the current range). It is noted that in a case where the difference is one, determining unit 810 stores a shift signal pattern at the time of the initial change (at the time of the first change in a shift signal) into the memory, and in a case where a shift signal pattern has further changed from the stored pattern, prohibits execution of the first fail-safe traveling (maintenance of the current range) even if the difference is one because it is highly possible that a shift manipulation has been performed. The above chain of processes is "prohibition determination based on a result of a difference check".

It is noted that a precondition for allowing execution of the first fail-safe traveling when the difference is equal to or less than "1" is at least that the shift sensor is designed to make no erroneous determination of other ranges when the difference is equal to or less than "1". In shift sensor 80 according to the present embodiment, the number of shift signals that differ between shift patterns of P, R, N, and D is each equal to or more than "3", and the threshold value "1" for the difference is less than the minimum number "3" of shift signals that differ between the shift patterns; therefore, the precondition is satisfied. The threshold value for the difference may be changed to any value greater than "1" (for example, "2") as long as the precondition is satisfied.

Next, "prohibition determination based on the shift position" will be described. A difference obtained through the above-described "difference check" alone may not make it possible to appropriately isolate whether a shift abnormality is triggered by a shift manipulation or by a sensor failure. First, this point will described using FIGS. 6 and 7.

Figure 6:
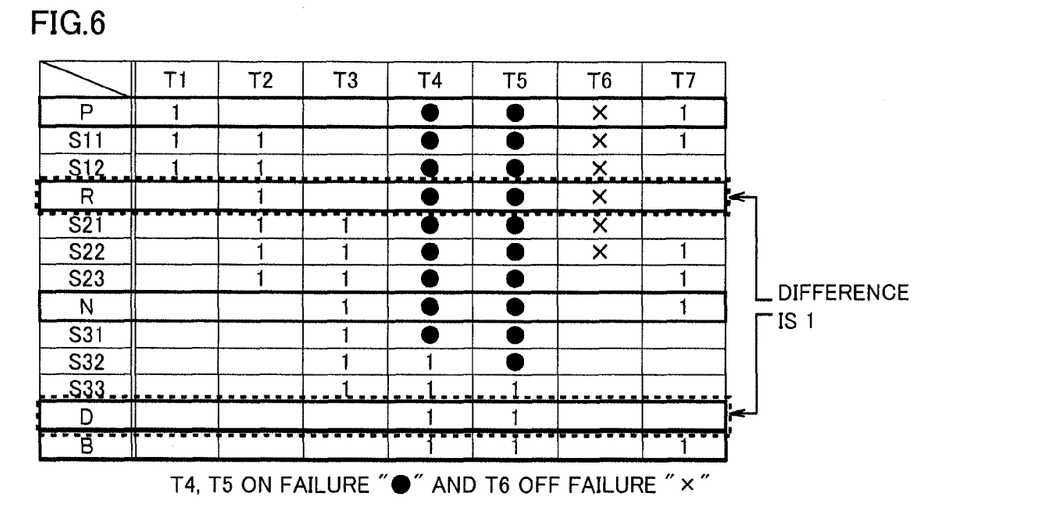
FIG. 6 is a (first) diagram illustrating shift signal patterns at the time of sensor failures.
Figure 7:
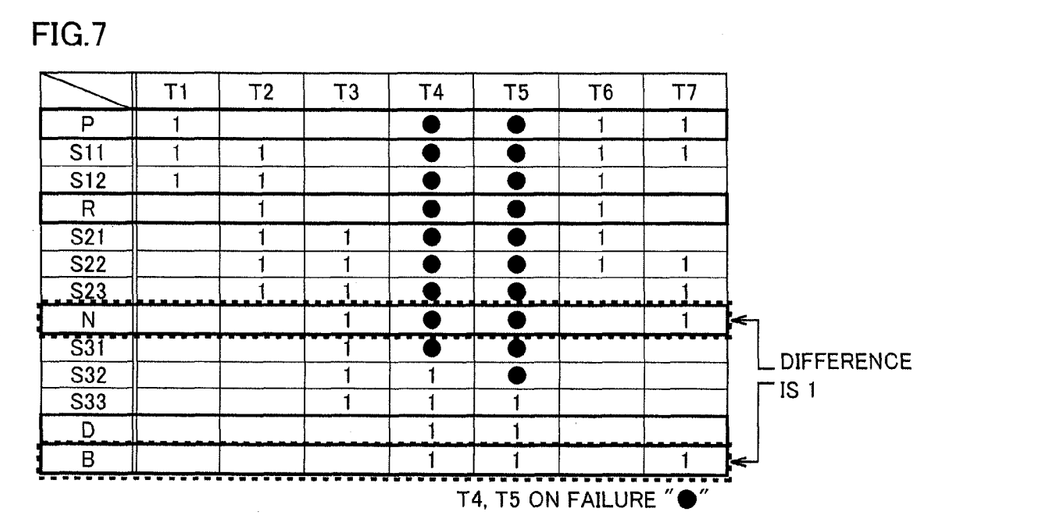
FIG. 7 is a (second) diagram illustrating shift signal patterns at the time of sensor failures.

FIGS. 6 and 7 are diagrams both illustrating shift signal patterns at the time of sensor failures. In FIGS. 6 and 7, the horizontal axes show types of shift signals, the vertical axes show shift positions, wherein "1" represents "ON", a blank field represents "OFF", "●" represents "ON failure", and "×" represents "OFF failure".

FIG. 6 shows shift signal patters at the time of a triple failure of an ON failure of T4, an ON failure of T5, and an OFF failure of T6. Even at such a triple failure, when the shift position is the D position, the shift signal pattern agrees with the D pattern [T4, T5]; therefore no shift abnormality occurs, and the requested range is recognized as the D range. Subsequently, when the shift position is moved to the R position, whereas T2 is turned ON, T4 and T5 are not turned OFF and T6 is also not turned ON; therefore, in the end, the shift signal pattern is [T2, T4, T5], and a shift abnormality in which a shift signal pattern corresponds to none of the normal patterns shown in FIG. 4 occurs. In this case, the type of the shift signals that have changed is "T2" only, and the result of a difference check is "1". Therefore, if only "determination process based on a result of a difference check" were relied upon, even though the true requested range is the R range, the present D range would be maintained (such an erroneous determination will hereinafter also be referred to as "erroneous determination of a counter directional range").

FIG. 7 shows shift signal patterns at the time of a double failure of an ON failure of T4 and an ON failure of T5. Even at such a double failure, when the shift position is the B position, the shift signal pattern agrees with the B pattern [T4, T5, T7]; therefore, no shift abnormality occurs, and the requested range is recognized as the B range. Subsequently, when the shift position is moved to the N position, whereas T3 is turned ON, T4 and T5 are not turned OFF; therefore, in the end, the shift signal pattern is [T3, T4, T5, T7], and a shift abnormality occurs. Also in this case, the result of a difference check is "1". Therefore, if only "determination process based on a result of a difference check" were relied upon, even though the true requested range is the N range (non-driving range), execution of the first fail-safe traveling would be permitted, and the current B range (driving range) would maintained (such an erroneous determination will hereinafter also be referred to as "erroneous determination of an OR (overrun) range").

To prevent the above-described erroneous determinations of the counter directional range (see FIG. 6) and the OR range (see FIG. 7), in a case where the current range is the D range or the B range, determining unit 810 determines whether or not shift signal T3 has been input or not (that is, whether or not it is possible that the shift position has been moved from the D position or the B position to an S33 position (towards the N position), and prohibits execution of the first fail-safe traveling (maintenance of the D range or the B range) at the time of input of shift signal T3. The chain of these processes is "prohibition determination based on the shift position".

Referring back to FIG. 5, switching unit 820 will be described. Switching unit 820 determines whether or not there is a shift abnormality (whether or not a shift signal pattern corresponds to any of the plurality of predefined normal patterns shown in FIG. 4) and switches the shift range in accordance with a result of the determination.

In a case where there is no shift abnormality, switching unit 820 performs normal traveling. In normal traveling, upon agreement of a shift signal pattern with any of normal patterns for P, R, N, D, and B (see FIG. 4), switching unit 820 switches the shift range to a range corresponding to the shift signal pattern.

In the event of a shift abnormality, switching unit 820 performs fail-safe traveling. In fail-safe traveling, switching unit 820 selects a shift range for fail-safe traveling in accordance with a result of the determination by determining unit 810.

In a case where execution of the first fail-safe traveling is permitted, switching unit 820 executes the first fail-safe traveling, thereby maintaining the current range (a shift range before occurrence of the shift abnormality) and causing vehicle 1 to perform fail-safe traveling in the current range.

In a case where the first fail-safe traveling is prohibited, switching unit 820 executes the second fail-safe traveling, thereby switching the shift range from the current range to the N range and causing vehicle 1 to perform fail-safe traveling in the N range.

Figure 8:
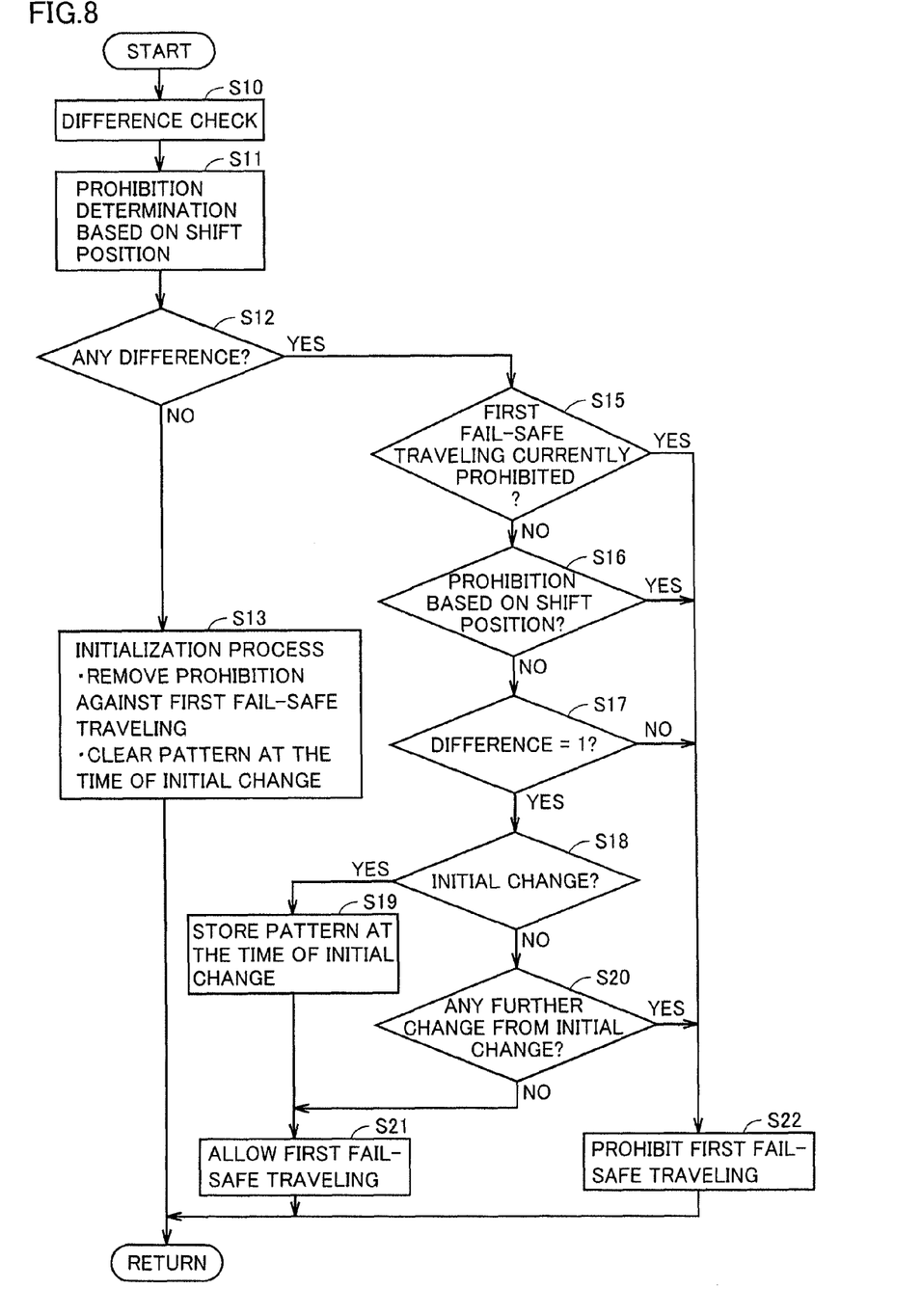
FIG. 8 is a (first) flowchart illustrating a process procedure of the ECU.

FIG. 8 is a flowchart illustrating a process procedure of ECU 800 for realizing the functions of determining unit 810 as described above. The flowchart shown in FIG. 8 is repeatedly executed at a predetermined period.

In step (step will be hereinafter abbreviated as "S") 10, ECU 800 performs the above-described "difference check".

In S11, ECU 800 performs the above-described "prohibition determination based on the shift position".

In S12, ECU 800 determines whether or not there is a difference.

If there is no difference (NO in S12), then ECU 800 performs an initialization process in S13 and subsequently terminates the process. It is noted that the initialization process includes a process of removing the prohibition against execution of the first fail-safe traveling in a case where such execution is prohibited and a process of clearing (erasing) a shift signal pattern at the time of the initial change in a case where such a pattern is stored.

If, on the other hand, there is a difference (YES in S12), then ECU 800 determines in S15 whether or not execution of the first fail-safe traveling is currently prohibited. If the first fail-safe traveling is currently prohibited (YES in S15), then the process proceeds to S22. Otherwise (NO in S15), the process proceeds to S16.

In S16, ECU 800 determines whether or not the first fail-safe traveling has been prohibited by "prohibition determination based on the shift position" that was performed in S11. If the first fail-safe traveling has been prohibited by the "prohibition determination based on the shift position" (YES in S16), then the process proceeds to S22. Otherwise (NO in S16), the process proceeds to S17.

In S17, ECU 800 determines whether or not the difference is one. If the difference is one (YES in S17), then the process proceeds to S18. Otherwise (NO in S17), the process proceeds to S22.

In S18, ECU 800 determines whether or not the shift signal pattern change in this time is the initial change. This determination is made based on whether or not the shift signal pattern at the time of the initial change is already stored in the memory. If the shift signal pattern change in this time is the initial change (YES in S18), then the process proceeds to S19. Otherwise (NO in S18), the process proceeds to S20.

In S19, ECU 800 stores the current shift signal pattern as the shift signal pattern at the time of the initial change and subsequently causes the process to proceed to S21.

In S20, ECU 800 determines whether or not the present shift signal pattern has further changed from the shift signal pattern at the time of the initial change stored in the memory. If the current shift signal pattern has further changed from the shift signal pattern at the time of the initial change (YES in S20), then the process proceeds to S22. Otherwise (NO in S20), the process proceeds to S21.

In S21, ECU 800 determines to allow execution of the first fail-safe traveling. In S22, ECU 800 determines to prohibit execution of the first fail-safe traveling. It is noted that a result of the determination in S21 or S22 is stored in the memory.

Figure 9:
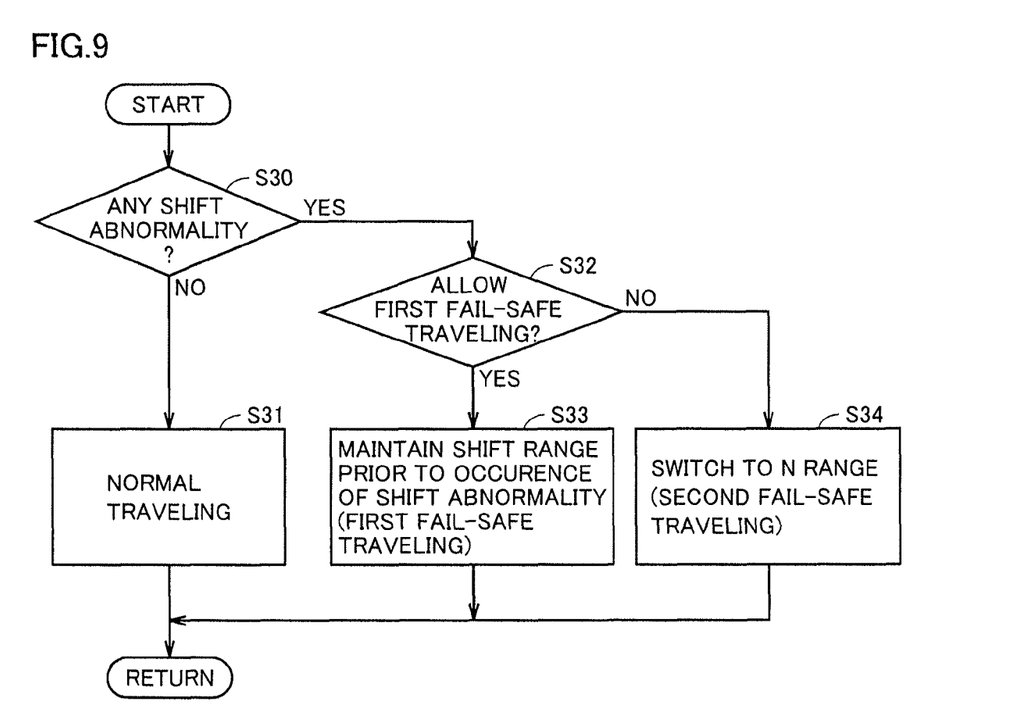
FIG. 9 is a (second) flowchart illustrating a process procedure of the ECU.

FIG. 9 is a flowchart illustrating a process procedure of ECU 800 for realizing the functions of switching unit 820 as described above. The flowchart shown in FIG. 9 is repeatedly executed at a predetermined period.

In S30, ECU 800 determines whether or not there is a shift abnormality. If there is no shift abnormality (NO in S30), then ECU 800 causes the process to proceed to S31 and performs normal traveling.

If there is a shift abnormality (YES in S32), then ECU 800 causes the process to proceed to S32 and determines whether or not execution of the first fail-safe traveling is allowed.

If the process in S21 of FIG. 8 has been performed to allow execution of the first fail-safe traveling (YES in S32), then ECU 800 causes the process to proceed to S33 and performs the first fail-safe traveling. That is, ECU 800 maintains a shift range before occurrence of the shift abnormality (the current range) to cause vehicle 1 to perform fail-safe traveling.

On the other hand, if the process in S22 of FIG. 8 has been performed to prohibit execution of the first fail-safe traveling (NO in S32), then ECU 800 causes the process to proceed to S34 and performs the second fail-safe traveling. That is, ECU 800 switches the shift range to the N range to cause vehicle 1 to perform fail-safe traveling.

As heretofore described, in the event of a shift abnormality, vehicle 1 according to the present embodiment appropriately isolates whether the shift abnormality was triggered by a shift manipulation or by a sensor failure in accordance with how shift signals have changed (the number and/or type of the signals that have changed) and, in accordance with a result of the isolation, determines whether or not to perform the first fail-safe traveling in which a shift range before occurrence of the shift abnormality is maintained. For this reason, fail-safe traveling that reflects a user's intention can be realized as compared with a conventional case where the shift range is forced to switch to the N range at the time of occurrence of a shift abnormality.

It should be understood that the embodiment disclosed herein is illustrative and non-restrictive in every respect. The scope of the present invention is defined by the terms of the claims, rather than by the foregoing description, and is intended to include any modifications within the scope and meaning equivalent to the terms of the claims.

REFERENCE SIGNS LIST

1 vehicle; 10 IG switch; 20 accelerator position sensor; 21 accelerator pedal; 30 brake stroke sensor; 31 brake pedal; 40 steering angle sensor; 41 steering wheel; 50 vehicle speed sensor; 80 shift sensor; 90 movable member; 91 shift lever; 92 push-pull cable; 93 shift gate; 93A groove; 100 drive device; 200 transmission device; 210 output shaft; 300 wheel; 800 ECU; 810 determining unit; 820 switching unit; A pivot shaft; B1, B2 power supply terminals; C shift connector; M1-M4 movable contacts; R1-R4 track; T1-T7 fixed contact (shift signal); W shift wire.

What is claimed is:

1. A vehicle comprising:
   a shift sensor that outputs a plurality of shift signals, said shift signals being output in accordance with a shift manipulation by a user; and
   a control device that controls a shift range in accordance with a combination of said shift signals,
   said control device monitors a change in said shift signals and, in the event of a shift abnormality where a combination of said shift signals after a change corresponds to none of a predefined plurality of combinations, executes, when the number of changes in said shift signals is equal to or less than a threshold value, first fail-safe traveling in which the shift range before occurrence of said shift abnormality is maintained, and prohibits execution of said first fail-safe traveling when a number of changes in said shift signals is greater than said threshold value.

2. The vehicle according to claim 1, wherein
   the combination of said shift signals is predefined such that the number of signals that differ between signal patterns including a signal pattern for a parking position, a signal pattern for a rearward position, a signal pattern for a neutral position, and a signal pattern for a forward position is equal to or more than a predetermined value, and
   said threshold value is set to a smaller value than said predetermined value.

3. The vehicle according to claim 1, wherein
   said control device stores a combination of said shift signals at the time of an initial change in said shift signals and, in a case where a combination of said shift signals has further changed from a stored combination, prohibits execution of said first fail-safe traveling even if the number of changes in said shift signals is equal to or less than said threshold value.

4. The vehicle according to claim 1, wherein
   in the event of said shift abnormality, when the shift range before occurrence of said shift abnormality is a particular shift range, said control device executes said first fail-safe traveling until a new input of a predetermined shift signal is received regardless of whether the number of changes in said shift signals is equal to or less than said threshold value, and prohibits execution of said first fail-safe traveling at the time of receiving the new input of said predetermined shift signal.

5. The vehicle according to claim 1, wherein
   in a case where said shift abnormality has occurred and where execution of said first fail-safe traveling is prohibited, said control device executes a second fail-safe traveling in which the shift range is switched to a predetermined shift range.

6. The vehicle according to claim 5, wherein
   said predetermined shift range is a neutral range.

7. A control method for a vehicle that includes a shift sensor outputting a plurality of shift signals, the shift signals being output in accordance with a shift manipulation by a user and a control device controlling a shift range in accordance with a combination of said shift signals, said method comprising the steps of:

monitoring a change in said shift signals; and in the event of a shift abnormality where a combination of said shift signals after a change corresponds to none of a predefined plurality of combinations, executing, when the number of changes in said shift signals is equal to or less than a threshold value, first fail-safe traveling in which the shift range before occurrence of said shift abnormality is maintained, and prohibiting execution of said first fail-safe traveling when a number of changes in said shift signals is greater than said threshold value.

* * * * *